United States Patent
Fiedler et al.

(10) Patent No.: US 7,522,985 B2
(45) Date of Patent: Apr. 21, 2009

(54) METHOD AND ARRANGEMENT FOR MONITORING A MEASURING DEVICE LOCATED IN A WHEELED VEHICLE

(75) Inventors: Jens Fiedler, Thalmassing (DE);
Andreas Mayer, Regensburg (DE);
Thomas Schweiger, W‚örth (DE);
Martin Stratesteffen, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 335 days.

(21) Appl. No.: 10/596,365

(22) PCT Filed: Oct. 28, 2004

(86) PCT No.: PCT/EP2004/052707

§ 371 (c)(1),
(2), (4) Date: Jun. 9, 2006

(87) PCT Pub. No.: WO2005/056360

PCT Pub. Date: Jun. 23, 2005

(65) Prior Publication Data

US 2007/0179735 A1    Aug. 2, 2007

(30) Foreign Application Priority Data

Dec. 12, 2003   (DE) ................................ 103 58 337

(51) Int. Cl.
*G06F 19/00* (2006.01)
(52) U.S. Cl. ............................ 701/70; 701/79; 701/110; 702/150; 180/170; 180/197
(58) Field of Classification Search .................. 701/70, 701/79, 110; 702/150; 180/170, 197
See application file for complete search history.

(56) References Cited

U.S. PATENT DOCUMENTS 5,408,411 A   4/1995   Nakamura et al. ..... 364/424.01

(Continued)

FOREIGN PATENT DOCUMENTS

DE   42 01 146 A1   7/1992

(Continued)

OTHER PUBLICATIONS

International Search Report and the Written Opinion of the International Searching Authority, or the Declaration for Application No. PCT/EP2004/052707, 21 pages, Mar. 9, 2005.

(Continued)

*Primary Examiner*—Gertrude Arthur Jeanglaud
(74) *Attorney, Agent, or Firm*—Baker Botts L.L.P.

(57) ABSTRACT

For monitoring of a measuring device (1), located in a wheeled vehicle, the measuring device (1) is configured so as to measure three linear accelerations (in unit 3) of the wheeled vehicle, which extend perpendicular to each other, respectively, as well as three rotational speeds (in unit 4) and one respective rotational movement or a component of a rotational movement about an axis of the wheeled vehicle, the three axes running perpendicular to each other, respectively. At least components of an orientation of the wheeled vehicle in a vehicle-external coordinate system are determined (in unit 7) from the three rotational speeds, and at least one of the measured linear accelerations is monitored (in unit 9) using at least the components of the orientation and a comparative variable (from unit 8).

23 Claims, 3 Drawing Sheets

U.S. PATENT DOCUMENTS

| | | | |
|---|---|---|---|
| 6,141,604 A | 10/2000 | Mattes et al. | 701/1 |
| 6,260,405 B1 | 7/2001 | Horiuchi et al. | 73/1.37 |
| 6,285,933 B1 | 9/2001 | Kohler et al. | 701/34 |
| 6,360,147 B1 | 3/2002 | Lee et al. | 701/35 |
| 6,377,906 B1 | 4/2002 | Rowe et al. | 702/151 |
| 2003/0065430 A1 | 4/2003 | Lu et al. | 701/45 |

FOREIGN PATENT DOCUMENTS

| | | |
|---|---|---|
| DE | 196 03 430 A1 | 8/1997 |
| DE | 196 09 176 A1 | 9/1997 |
| DE | 197 44 084 A1 | 4/1999 |
| DE | 198 44 913 A1 | 4/2000 |
| DE | 100 54 154 A1 | 6/2001 |
| DE | 101 62 689 A1 | 7/2002 |
| DE | 102 20 575 A1 | 12/2003 |
| WO | 01/57474 | 8/2001 |

OTHER PUBLICATIONS

German Office Action for Application No. 103 58 337.5-52, 3 pages, Jun. 2, 2004.

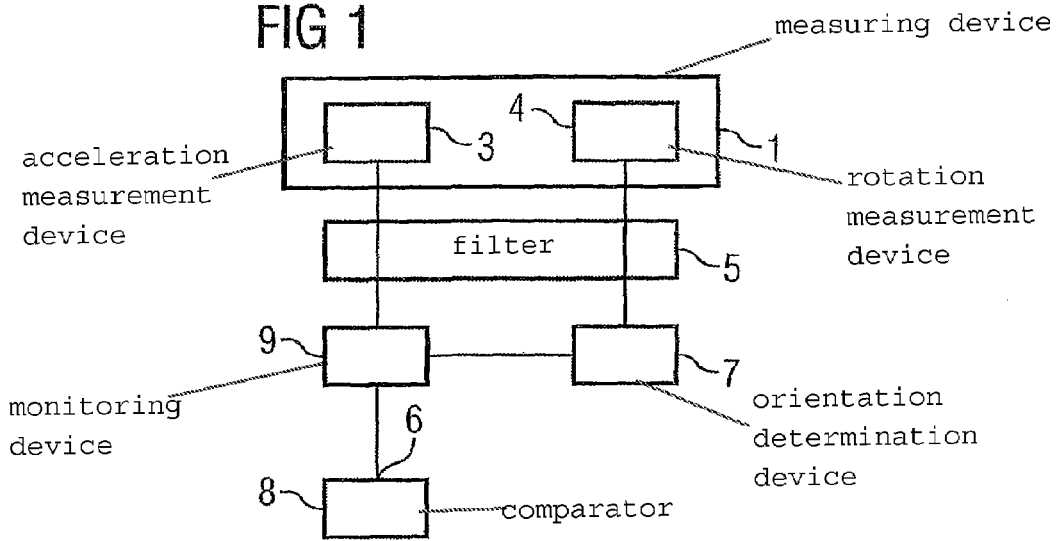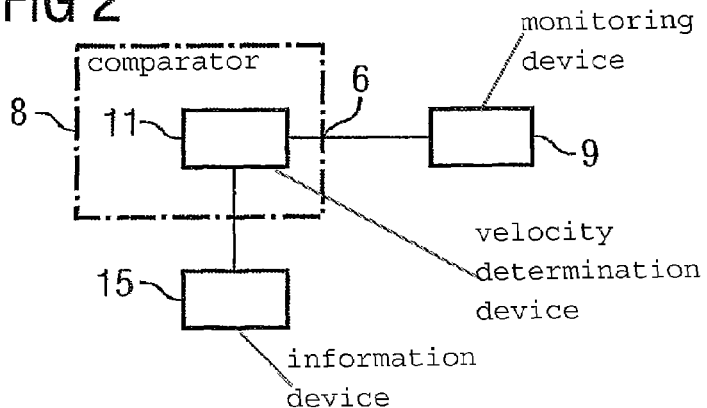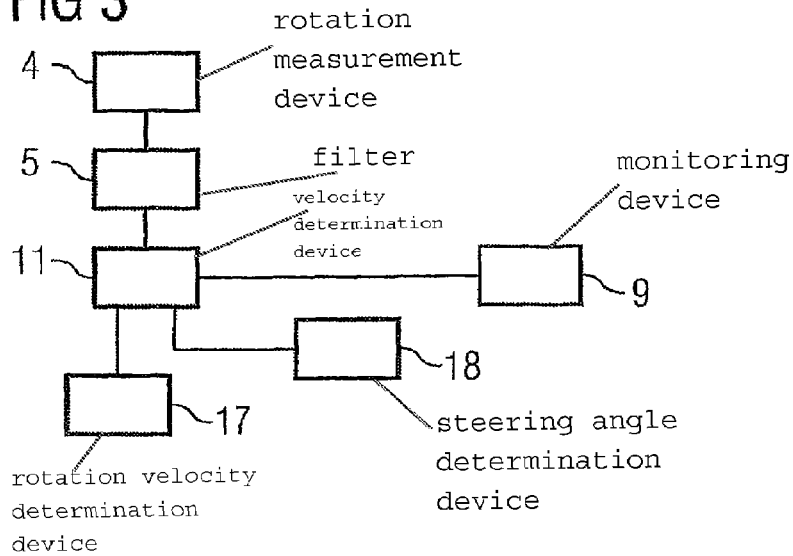

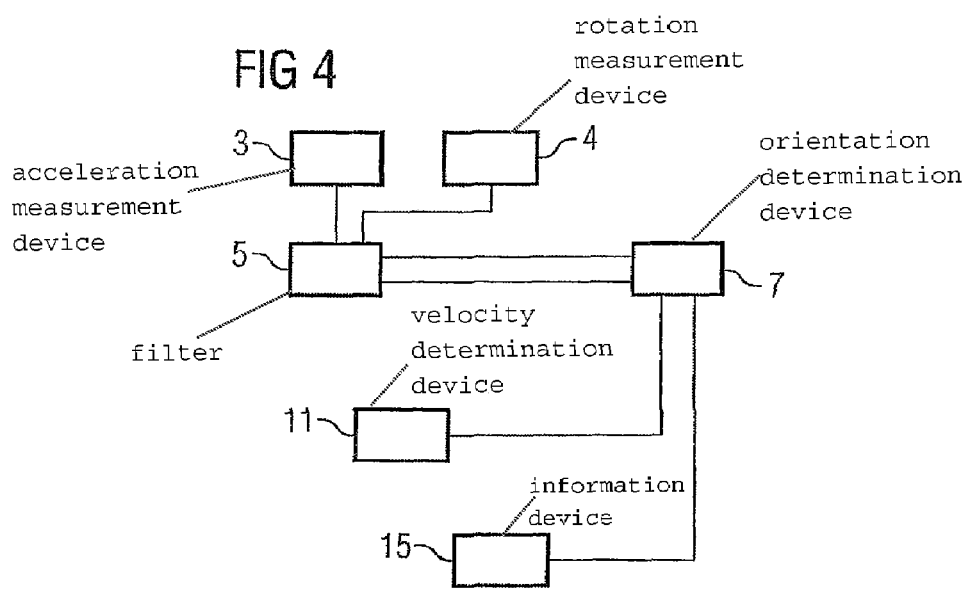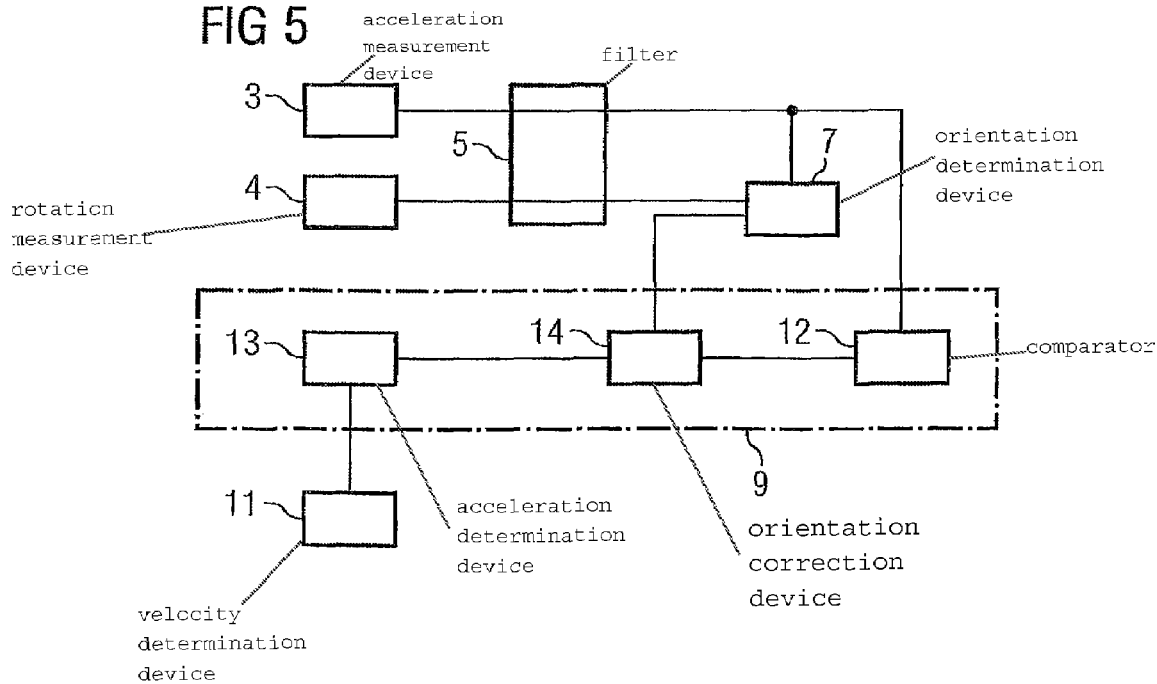

METHOD AND ARRANGEMENT FOR MONITORING A MEASURING DEVICE LOCATED IN A WHEELED VEHICLE

CROSS-REFERENCE TO RELATED APPLICATIONS

This application is a U.S. national stage application of International Application No. PCT/EP2004/052707 filed Oct. 28, 2004, which designates the United states of America, and claims priority to German application number DE 103 58 337.8 filed Dec. 12, 2003, the contents of which are hereby incorporated by reference in their entirety.

TECHNICAL FIELD

The invention relates to a method and an arrangement for monitoring a measuring device disposed in a wheeled vehicle.

BACKGROUND

Measuring devices incorporating e.g. acceleration sensors and rotation rate sensors supply input variables for electronic systems of modern wheeled vehicles (road motor vehicles, off-road wheeled vehicles and other non-guided wheeled vehicles). Such electronic systems include an anti-lock braking system (ABS), an electronic stability program (ESP), a navigation system, adaptive cruise control (ACC), roll-over protection, systems for stabilizing rolling motions in automobiles and commercial motor vehicles and also in trailers, a control system for controlling airbags, hill-holder systems, light-angle control for headlights, power steering systems, control systems for controlling vehicle suspension and/or damping, systems for controlling force transmission in the powertrain of the vehicle, engine control systems, display systems for indicating the fill level of fuel and other fluids, systems for detecting a vehicle's loading state and/or incorrect tire pressures, door locking systems, anti-theft systems, systems for controlling the vehicle's aerodynamic characteristics, accident data storage systems and detection and/or warning systems for providing indications and/or warnings in the case of severe inclination angles of an off-road vehicle. The invention particularly relates to a combination of the measuring device with at least one of these systems or with any combination of the above systems.

Acceleration sensors in particular supply essential information for the systems mentioned. In many cases the actual (real) longitudinal and/or lateral acceleration of the vehicle is required. On the other hand, acceleration sensors measure, as a function of the orientation of the vehicle, a measured variable that is falsified due to the gravitational force.

DE 196 03 430 A1 describes a circuit arrangement for determining axle loads for a motor vehicle using data supplied by sensors and having a processing circuit for processing said sensor data. In an embodiment of the circuit arrangement, an acceleration signal is corrected by the gravitational component using a gradient measured by a gradient sensor as part of a program to be executed in a control computer.

DE 198 44 913 A1 discloses an apparatus for monitoring a vehicle-mounted lateral acceleration sensor with which a first lateral acceleration variable is acquired. With the aid of determination means, a second lateral acceleration variable is directly determined as a function of wheel speed variables which are acquired using corresponding detection means. To monitor the lateral acceleration sensor, the filtered lateral acceleration variable is compared with the second lateral acceleration variable in monitoring means.

In this description the acceleration variable falsified by gravitational force will be termed the effective acceleration variable. When the vehicle is stationary, the acceleration sensor only measures the effects of gravitational force. The actual acceleration is not therefore present in the measured variable. However, for driving on an inclined surface (inclined in the longitudinal and/or lateral direction) the required actual acceleration is not measured directly. The measured variables available at the output of an acceleration sensor are therefore erroneous. This is all the more disadvantageous in that it is particularly on inclined surfaces that critical driving situations can arise in which the systems to be supplied with the actual acceleration must operate reliably. Similar erroneous measured variables are produced by acceleration sensors disposed in a vehicle body which inclines relative to the chassis during driving e.g. during an acceleration phase of the vehicle (lateral rolling and/or pitching motion in the longitudinal direction of the vehicle). A roll angle of as little as five degrees results in an error of approximately 1 m/s$^2$ in the lateral acceleration of the vehicle.

SUMMARY

The object of the present invention is to specify an arrangement and a method of the abovementioned type with which reliable measured values for vehicle motion can be provided.

The following is proposed: an arrangement for monitoring a measuring device disposed in wheeled vehicle, comprising
the measuring device, said measuring device being designed to measure three linear accelerations of the wheeled vehicle which are oriented perpendicularly to one another and three rotation rates, of a rotational movement or of a component of a rotational movement about an axis of the wheeled vehicle, the three axes running perpendicularly to one another,
an orientation determining device designed to determine from the three rotation rates an orientation of the wheeled vehicle in a coordinate system external to the vehicle, and
a monitoring device designed to perform monitoring of at least one measured linear acceleration using an output variable of the orientation determining device and using a comparison variable.

Additionally proposed is the following method for monitoring a measuring device disposed in a wheeled vehicle, said measuring device being designed to measure three linear accelerations of the wheeled vehicle which are oriented perpendicular to one another and three rotation rates of a rotational movement or of a component of a rotational movement about an axis of the wheeled vehicle, the three axes running perpendicular to one another:
from the three rotation rates, at least components of an orientation of the wheeled vehicle are determined in a coordinate system external to the vehicle and
using at least the components of the orientation and using a comparison variable, monitoring of at least one of the measured linear accelerations is performed.

According to the invention, a measuring device is monitored which measures three non-redundant rotation rates and three non-redundant linear accelerations. The measuring device can have a separate sensor e.g. for each measured variable. However, there are also sensors which simultaneously measure two of the abovementioned variables. In each case the measuring device supplies the measured variables required for providing reliable measured values. By determining the vehicle's orientation, which is performed specifically by the orientation determining device from the rotation rates, the effective acceleration values can be converted into the actual acceleration values.

In addition, monitoring of at least one of the measured linear accelerations takes place using an output variable of the orientation determining device and using a comparison variable. In other words, at least one component of the relevant orientation determined from the rotation rates is used together with the reference variable to monitor at least one of the linear accelerations. If monitoring establishes that the linear acceleration is not reliable e.g. because of a sensor defect, appropriate action can be taken. For example, it can be decided whether the measured linear acceleration is still suitable for forwarding to the systems mentioned or whether the comparison variable can be used. In particular, a system requiring the linear acceleration as input variable can be informed that the linear acceleration is possibly erroneous, or the system can be deactivated at least temporarily.

In particular, the inventive combination allows inclinations both in the longitudinal direction of the vehicle and in the lateral direction of the vehicle to be determined and the information ascertained therefrom to be used for monitoring and/or determining the actual linear acceleration.

In particular the traveling velocity of the wheeled vehicle is determined and the comparison variable is calculated taking the traveling velocity into account. Particularly suitable for this purpose is information concerning the rotation speed of at least one wheel of the wheeled vehicle, in particular the speeds of non-driven wheels of the vehicle. Information based on wheel rotation allows the traveling velocity to be reliably determined even in the case of heavily inclined roadways or surfaces. However, the traveling velocity can be alternatively or additionally determined in other ways.

For each of the sensors for determining at least one rotation rate or linear acceleration, the measuring device can have in particular a controller (e.g. in an ASIC) which controls the outputting of measurement signals in analog and/or digital form. In addition, the controller can perform initial checking of the sensor's signals by stimulating the production of sensor signals by transmitting test signals to the sensor, analyzing the sensor signals and checking the sensors signals by means of said analysis.

There is also proposed a computing device which in particular shares a common constructional unit with the measuring device. The computing device conditions the signals of the measuring device sensors (filters the signals particularly in a first filter process) and subjects the signals to a plausibility check. For the plausibility check the measured variables are derived e.g. with respect to time. The measured variables and/or their derivatives can then be compared with the limit values, the limit values possibly being dependent in particular on the driving situation of the vehicle. The above described controller can additionally monitor the computing device and vice versa. In addition, the above described monitoring of the measuring device, which will be explained in greater detail below, is performed particularly by the computing device using signals from devices which are not part of the measuring device. In particular, comparison values for all the rotation rates and linear accelerations measured by the measuring device can be determined in this way and used for monitoring the measured values. This will also be explained in greater detail below. Preferably the measured values thus monitored are used as input variables for calculating further variables, e.g. variables such as ride heights or spring travel of the vehicle's wheels relative to a vehicle body, axle loads and/or wheel loads. The computing device in this case has an interface via which the calculated values of the further variables can be transferred to other devices and/or systems.

In addition, at least one of the rotation rates measured by the measuring device can be monitored alternatively or additionally to monitoring the at least one linear acceleration. An appropriate reference value or comparison value can be determined, for example, from the acceleration values measured by the measuring device and at least one additional variable, said additional variable not being determined from measured values of the measuring device.

For example:
  a reference value for the yaw rate measured by the measuring device can be determined from the lateral acceleration measured by the measuring device and vice versa using at least the steering wheel angle or the steering angle of at least one steerable wheel;
  a reference value for the yaw rate measured by the measuring device can be determined from the lateral acceleration measured by the measuring device and vice versa using at least the traveling velocity in the longitudinal direction of the vehicle;
  a reference value for the yaw rate measured by the measuring device can be determined using the steering wheel angle or the steering angle of at least one steerable wheel and using the traveling velocity in the longitudinal direction of the vehicle;
  a reference value for the longitudinal acceleration (acceleration in the longitudinal direction of the vehicle) can be determined from the longitudinal velocity using a correction term calculated using the yaw rate;
  a reference value for the yaw rate can be determined from at least one rotational speed of a wheel of the vehicle using optionally the steering wheel angle or the steering angle of at least one steerable wheel;
  a reference value for the roll rate can be determined from the lateral acceleration additionally using the vehicle longitudinal velocity and the yaw rate;
  a reference value for the pitch rate can be determined from the longitudinal acceleration additionally using the vehicle longitudinal velocity and the yaw rate;
  a reference value for the roll rate can be determined from the lateral acceleration using a vehicle model which approximately describes the relative movement of a vehicle body and a chassis;
  a reference value for the pitch rate can be determined from the longitudinal acceleration using a vehicle model which approximately describes the relative movement of a vehicle body and a chassis; and/or
  reference values for the vertical acceleration, the roll rate and the pitch rate can be determined using signals from ride height sensors on wheels of the vehicle.

In appropriate developments of the proposed arrangement, the latter has, for determining a traveling velocity of the wheeled vehicle, a traveling velocity determining device which is connected to the monitoring device, said monitoring device being designed to determine the comparison variable using the traveling velocity. In particular, the traveling velocity determining device is designed to determine the traveling velocity using a variable characterizing a rotation speed of a wheel of the wheeled vehicle. The traveling velocity determining device can also be connected to a steering angle determining device for determining a steering angle of at least one steerable wheel of the wheeled vehicle, the traveling velocity determining device being designed to determine the traveling velocity using the steering angle. In addition, the traveling velocity determining device can be connected to the measuring device and designed such that the traveling velocity is determined using at least one of the three rotation rates.

The measuring device preferably has acceleration sensors for measuring the three linear accelerations and rotation rate sensors for measuring the three rotation rates, the acceleration sensors and the rotation rate sensors being parts of a prefabricated constructional unit for installation in the wheeled vehicle. Said unit is a special implementation of an IMU (Inertial Measurement Unit).

It is additionally preferred that the three linear accelerations can be measured by the measuring device as measured variables that are linearly independent of one another. The directions of the accelerations or acceleration components detected by the acceleration sensors preferably constitute the axes of a three-dimensional rectangular coordinate system. In particular, the measuring device can be designed such that at least the sensors used for measuring the three linear accelerations supply non-redundant measured variables.

The same preference applies to the orientation of the three axes about which the rotational movements are executed, the rotation rates of which are measured by the measuring device. In other words, the measuring device is designed such that the three axes run pairwise perpendicular to one another.

In particular, the monitoring of the at least one measured linear acceleration can be performed using the orientation and using a comparison acceleration, said comparison acceleration being determined without using the to-be-monitored linear acceleration measured by the measuring device. However, it is also possible to convert the linear acceleration to be monitored into another variable and compare it with an appropriate comparison variable.

In particular, the comparison variable can be determined using a position of a vehicle body on which the measuring device is mounted or is to be mounted, relative to a chassis. The relative position the vehicle body and the chassis is measured, for example, by so-called ride height sensors which measure the instantaneous height of the vehicle body above a fixed reference point with respect to a wheel. The ride height corresponds to the instantaneous spring travel for a spring-suspended vehicle body.

The orientation determining device determines the orientation of the vehicle by integration of a system of three equations. This will be explained in greater detail below. The orientation can also be determined by means of quaternions (see e.g. WO 01/57474 A1). For the integration, only the variation in position compared to a reference position can be determined. It is therefore proposed that the orientation determining device detects a stationary state of the wheeled vehicle and, during said stationary state, determines values for an in particular future determination of the orientation using at least one of the linear accelerations measured by the measuring device, it being possible using the measured effective acceleration in the lateral and longitudinal direction of the vehicle to determine the roll angle and pitch angle in absolute terms and therefore fix the position relative to the earth coordinate system. The yaw angle (angle about the vertical) is e.g. set to zero while the vehicle is stationary.

It is further proposed, as an alternative or additional possibility, for straight-ahead travel of the wheeled vehicle on a level surface to be detected and for values for in particular future determination of the orientation to be calculated in this driving situation using at least one of the linear accelerations measured by the measuring device. In other words, adjustment of the roll angle and pitch angle is possible even during straight-ahead travel on a level surface.

It is further proposed as an additional possibility, particularly in driving situations in which the vehicle is detected to be stably moving (i.e. free from rolling and/or pitching movements), for values to be determined from at least one of the measured acceleration components in order thereby, within a short time interval (e.g. a few tenths of a second to a few seconds, e.g. 2 seconds,) to perform an adjustment of the roll or pitch angle determination from the rotation rate signals. This possibility can be used in particular when the vehicle does not come to a standstill for a long period of time or is not traveling straight ahead on a level surface.

BRIEF DESCRIPTION OF THE DRAWINGS

The invention will now be explained in greater detail using examples. Reference will be made to the accompanying schematic drawings and a preferred embodiment. In the drawings, the same reference numerals are used to denote identical, functionally identical or equivalent units or devices. In the individual Figures:

FIG. 1 shows an arrangement for monitoring a measuring device disposed in a wheeled vehicle, FIG. 2 shows an example of a comparison variable device which, according to a preferred embodiment of the invention, can be part of the arrangement illustrated in FIG. 1, FIG. 3 shows an example according to a preferred embodiment of the invention for a combination of the comparison variable device shown in FIG. 2 with sensors or devices for supplying information to the comparison variable device, FIG. 4 shows an example according to a preferred embodiment of the invention for a combination of the orientation determining device illustrated in FIG. 1 with other devices in order to determine output values for the orientation of the vehicle in particular driving situations, FIG. 5 shows an example according to a preferred embodiment of the invention for a configuration of the monitoring device illustrated in FIG. 1 with other devices connected thereto.

DETAILED DESCRIPTION

Figure 6:
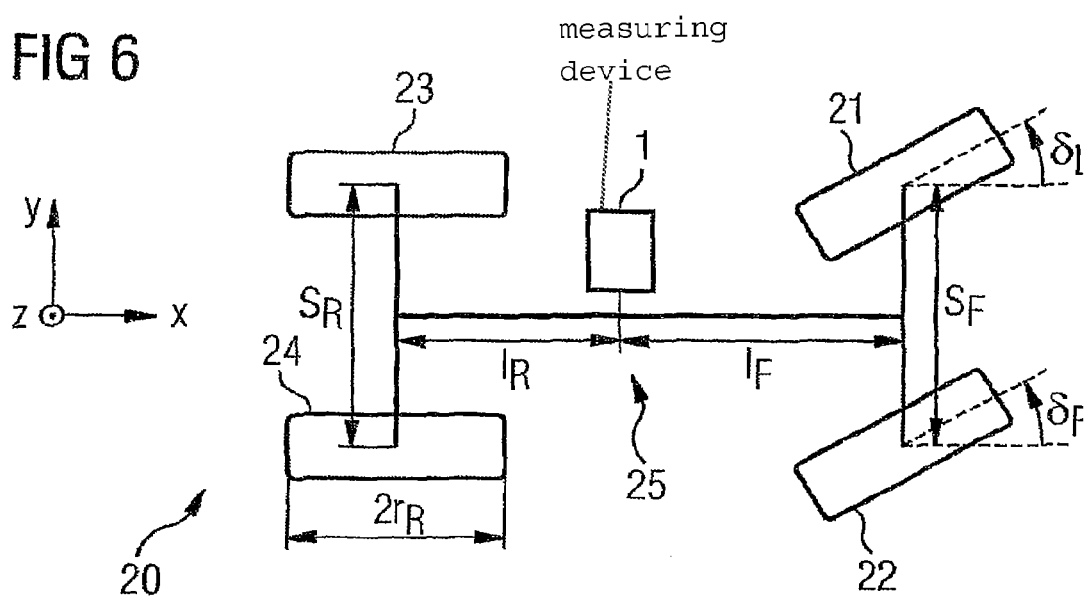
FIG. 6 shows a road motor vehicle in order to explain dimensions and angles and FIG. 7 shows an example of a configuration of the measuring device illustrated in FIG. 1.

The arrangement shown in FIG. 1 has a measuring device 1, a filter device 5, an orientation determining device 7, a comparison variable device 8 and a monitoring device 9. The measuring device 1 in turn has an acceleration measuring device 3 and a rotation rate measuring device 4. The measuring device 1 is in particular a constructional unit, the relevant sensors for measuring the accelerations and rotation rates being disposed in fixed positions relative to one another in said unit. Otherwise than shown in FIG. 1, the constructional unit can have other of the devices and units mentioned in this description, in particular the filter device 5, the orientation determining device 7 and/or the monitoring device 9. The constructional unit is preferably designed to be mounted on or near the center of gravity of the motor vehicle, a particular orientation in the motor vehicle being aimed for.

Figure 7:
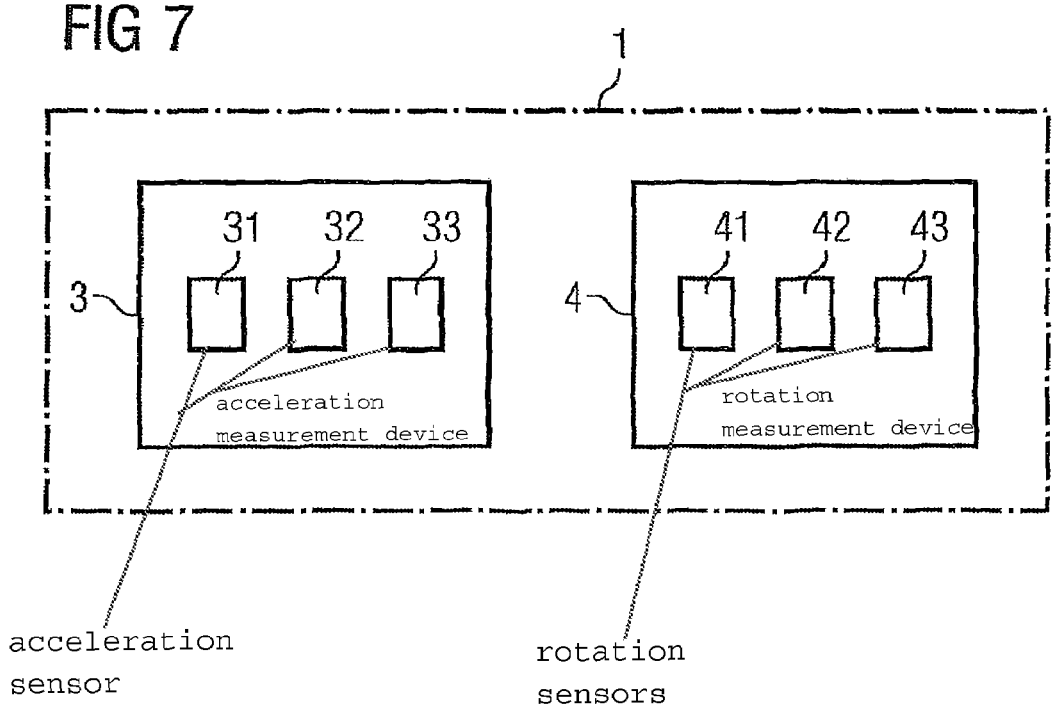

In particular, the acceleration measuring device 3 has three linear acceleration sensors 31, 32, 33 (FIG. 7) which are disposed in such a way that one of the acceleration sensors measures an acceleration or acceleration component of the vehicle in the direction of the axes of a Cartesian coordinate system, the x-axis pointing forward in the longitudinal direction of the vehicle, the y-axis oriented at right angles to the longitudinal axis and the z-axis (for a horizontally oriented vehicle) pointing vertically upward. Such a coordinate system is schematically illustrated in FIG. 6. This Figure shows a road motor vehicle 20 with two steerable front wheels 21, 22 and two non-steerable rear wheels 23, 24. In the state illustrated, the front wheels are turned to the left and have a steering angle of $\delta_L$ (left front wheel 21) or $\delta_R$ (right front wheel 22) with respect to the x-axis. The spacing between the front wheels 21, 22 is $s_F$, the spacing between the rear wheels 23, 24 is $s_R$. $r_R$ denotes the radius of the rear wheels 23, 24. The measuring device 1 is disposed approximately in the center of the motor vehicle 25 in the longitudinal direction. It has a spacing $l_F$ from the axis of the front wheels 21, 22 and a spacing of $l_R$ from the axis of the rear wheels 23, 24 in the longitudinal direction.

The invention is not limited to wheeled vehicles with front wheel steering. In fact also the rear wheels can additionally be steerable, for example.

Referring again to FIG. 1, the acceleration measuring device 3 is connected to the monitoring device 9 via the filter device 5. The rotation rate measuring device 4 is connected via the filter device 5 to the orientation determining device 7 which is in turn connected to the monitoring device 9. The comparison variable device 8 is also connected to the monitoring device 9.

The filter device 5 shown in FIG. 1 is representative of other filter devices which can be additionally provided for the arrangements shown in FIGS. 1 to 5 or for variants thereof. The filtering of measurement signals, and/or signals derived therefrom, performed by the filter devices is used in particular for eliminating any noise present and eliminating high-frequency fluctuations of the measurement signals, e.g. caused by vibrations of the vehicle body. The filter devices can have in particular at least one low-pass filter and/or at least one band-pass filter.

The filter device 5 shown in FIG. 1 filters the acceleration signals measured by the acceleration measuring sensors of the acceleration measuring device 3 and the rotation rate signals measured by the rotation rate measuring sensors of the rotation rate measuring device 4 before they are transferred to the monitoring device 9 or to the orientation determining device 7. Using a comparison variable received via an output 6 of the comparison variable device 8, the monitoring device 9 performs monitoring of at least one of the three measured acceleration variables from the acceleration measuring device 3. For this purpose the monitoring device 9, as will be described in greater detail with reference to an example, uses at least two angles (the roll angle and the pitch angle of the vehicle) which (in addition to the yaw angle) are a measure of the orientation of the vehicle in an earth-fixed coordinate system.

As FIG. 2 shows, the comparison variable device 8 can have a traveling velocity determining device 11 which is connected to an information device 15 and to the monitoring device 9. From the information device 15, the traveling velocity determining device 11 receives information such as at least one steering angle of a steerable wheel and wheel rotation speeds, in particular of the non-driven wheels of the vehicle. It calculates therefrom the instantaneous traveling velocity and transmits appropriate signals via the output 6 to the monitoring device 9. However, the information transmitted from the information device 15 to the traveling velocity determining device 11 can also be of another kind and contain, instead of the wheel rotation speeds, for example, information about the vehicle's traveling velocity determined by other means. If, in addition to the wheel rotation speeds and the steering angle, information concerning drive torques and/or braking torques (and/or equivalent variables, e.g. braking forces) is available, a slip correction can be performed. The traveling velocity determined on the basis of the wheel rotation speeds can be used in this case even if a slip occurs between the wheels and the surface beneath the vehicle.

FIG. 3 shows an arrangement according to the case of FIG. 2 in which the information device 15 is implemented by a rotation speed determining device 17 for determining the rotation speed of at least one wheel of the vehicle and by a steering angle determining device 18 for determining a steering angle of at least one steerable wheel. In addition, the traveling velocity determining device 11 is connected via the filter device 5 to the rotation rate measuring device 4 from which it receives information about at least one of the three rotation rates (in particular the yaw rate) and calculates the traveling velocity using the at least one rotation rate.

The arrangement according to FIG. 4 is used for determining initial values for the determining of the vehicle orientation in the orientation determining device 7. The acceleration measuring device 3 and the rotation rate measuring device 4 are connected to the orientation determining device 7 via the filter device 5. In addition, the orientation determining device 7 is connected to the traveling velocity determining device 11 and the information device 15.

When the orientation determining device 7 establishes that the traveling velocity is zero, it determines, as will be described in greater detail with reference to an example, the orientation of the vehicle and determines therefrom initial values for a future calculation of the orientation while the vehicle is traveling. Alternatively or additionally, the arrangement shown in FIG. 4 can be used for determining the initial values during straight-ahead travel at constant traveling velocity on a level surface.

A possible setup of the monitoring device 9 is shown in FIG. 5 whereby the monitoring device 9 has an acceleration determining device 13, an orientation correction device 14 connected thereto and a comparison device 12 which is likewise connected to the orientation correction device 14. The acceleration determining device 13 is connected to the traveling velocity determining device 11. The orientation correction device 14 is connected to the orientation determining device 7. The comparison device 12 is connected via the filter device 5 to the acceleration measuring device 3.

In a particular embodiment of the arrangement shown in FIG. 5, the acceleration determining device 13 is connected via the filter device 5 to the rotation rate measuring device 4 so that the measured yaw rate can be used to calculate the vehicle acceleration in the longitudinal direction and in the lateral direction. It is also possible, however, to determine the yaw rate by other means and use it to calculate the acceleration. For example, the yaw rate can be determined from the vehicle's velocity in the longitudinal direction and the steering angle. As an alternative to the setup shown in FIG. 5, the comparison device 12 and the orientation correction device 14 can be interchanged, for example.

When the monitoring device 9 is operating, it receives traveling velocity values from the traveling velocity determining device 11, calculates therefrom acceleration values in the acceleration determining device 13 without using information from the acceleration measuring device 3 or (with the possible exception of the yaw rate) from the rotation rate measuring device 4 and transmits the determined acceleration values to the orientation correction device 14 where the actual acceleration values determined for the vehicle are converted into effective acceleration values using at least components of the vehicle orientation determined by the orientation determining device 7. In the comparison device 12, the thus determined reference values for the effective acceleration are then compared with the values measured by the acceleration measuring device 3.

Particularly if the vehicle neither comes to a standstill over a lengthy period of time nor travels straight ahead on a level surface during this time, in a brief time interval of e.g. 1 to 3 seconds in which it is detected that the vehicle is traveling stably (i.e. particularly in the case of good static friction of the wheels) an adjustment of the vehicle orientation determination is performed in the following manner: the acceleration values determined by the acceleration determining device 13 are subtracted from the measured values of the acceleration measuring device 3 filtered by the filter device 5. To adjust the vehicle orientation, these differences are handled in the same way as the measured values of the acceleration measuring device 3 filtered by the filter device 5 in the case of a stationary vehicle.

A specific example of monitoring will now be described in greater detail. To determine the vehicle orientation, the instantaneous orientation of the vehicle is calculated from the filtered rotation rates measured by the rotation rate measuring device, namely by determining the roll angle (angle of a rotational movement about the x-axis), the pitch angle (angle of a rotational movement about the y-axis) and the yaw angle (angle of a rotational movement about the z-axis). The roll angle, the pitch angle and the yaw angle are in particular the angles defined in accordance with German Industrial Standard (DIN) 70000.

The angles are determined in particular by integration of the following system of equations:

$$\dot{\phi} = \omega_x + (\omega_y \sin\phi + \omega_z \cos\phi)\tan\theta$$

$$\dot{\theta} = \omega_y \cos\phi - \omega_z \sin\phi$$

$$\dot{\psi} = (\omega_y \sin\phi + \omega_z \cos\phi)/\cos\theta$$

where $\phi$ is the roll angle, $\theta$ is the pitch angle, $\psi$ is the yaw angle and $\omega$ the measured rotation rate about the vehicle coordinate system's coordinate axis specified in the subscript of the relevant variable.

Alternatively the angles are determined according to the abovementioned quaternions method from more than three differential equations. To adjust the angle values, optionally a consistency test is first performed to test whether the sum of the squares of the three measured linear accelerations lies in a defined range around the square of the gravitational constant g of the earth's attraction. For practical purposes it suffices to make g=9.81 m/s$^2$ and to specify a tolerance threshold for a maximum deviation. The tolerance threshold depends particularly on the quality of the signals of the acceleration sensors, whereby particularly re-filtered acceleration signals can be used after filtering by the filter device 5. If the consistency test is not passed, an error in the measurement of the acceleration values is inferred and appropriate action can be taken (e.g. disabling of the systems which use at least one of the measured acceleration values as an input variable). However, an error may also initially be merely noted and the consistency test repeated.

If the consistency test is successful or a consistency test is not performed, the roll angle and the pitch angle are calculated according to the following relations:

$$\theta = \arcsin(\langle a_x \rangle / g)$$

$$\phi = \arctan(\langle a_y / a_z \rangle)$$

where $\langle \ldots \rangle$ is a time average over an interval during which the vehicle is stationary, and $a_x$, $a_y$, $a_z$ are the effective acceleration values measured by the measuring device in the direction of the x-axis, y-axis or z-axis of the vehicle coordinate system. The yaw angle is set to zero e.g. by turning on the ignition of a motor vehicle after a break in operation. It remains unchanged while the vehicle is stationary.

The stationary state of the vehicle can be established by one of the following criteria and by combining the two following criteria:
- All the measured rotation speeds of the vehicle's wheels are zero.
- The vehicle velocity determined by means other then evaluating the wheel rotation speeds is zero.
- In addition, the following criteria can be determined:
- The acting drive torque is zero on all driven wheels.
- A vehicle brake for braking a traveling movement of the vehicle is active.

Preferably all these criteria are used simultaneously for determining the stationary state of the vehicle.

In addition, while the vehicle is traveling a check is performed to ascertain whether the vehicle is traveling straight ahead on a level surface. This driving situation is detected by checking the following parameters:
- The steering angle of all the steerable wheels of the vehicle is zero. Alternatively the steering wheel angle, for example, can be checked to determine whether it is zero.
- All three rotation rates measured by the rotation rate measuring device are zero.
- The values of the lateral acceleration (y-direction) measured by the acceleration measuring device does not change.

If these criteria are fulfilled, the roll angle and the pitch angle are re-calculated according to the relations given above.

The roll angle and pitch angle values determined in the stationary state and/or when the vehicle is traveling straight ahead on a level surface are used as initial values for the integration of the system of three equations given earlier. It is consequently possible to specify the roll angle and the pitch angle in respect of the earth coordinate system. This allows the measured effective acceleration values to be converted into actual acceleration values and/or a corresponding conversion to be performed for the monitoring of the measured values, as will be explained in greater detail below.

It will now be described how reference values for the measured lateral acceleration and the measured longitudinal acceleration can be determined from the traveling velocity of the vehicle (in the longitudinal direction and at right angles to the longitudinal direction, i.e. the x-component and the y-component of the traveling velocity of the vehicle coordinate system).

For this purpose there are different possibilities which can be used singly or in combination as a function of the characteristics of the vehicle and of the other requirements.

If the front wheels of the vehicle are not driven, the wheel rotation speeds of the front wheels are preferably used in accordance with the following relations for determining the vehicle longitudinal velocity (subscript x) and determining the vehicle lateral velocity (subscript y):

$$v_x = \frac{1}{2} r_F (n_{FL} \cos\delta_L + n_{FR} \cos\delta_R)$$

$$v_y = \frac{1}{2} r_F (n_{FL} \sin\delta_L + n_{FR} \sin\delta_R) - \omega_z l_F$$

where v is the relevant vehicle velocity in the x-direction or y-direction, $r_F$ the radius of the front wheels, n the relevant wheel rotation speed (the first subscript F signifying "front wheel", the second subscript L "left" and the second subscript R "right"), δ the steering angle of the relevant wheel (the subscript L signifying "left" and the subscript R "right"), $l_F$ the spacing as described in FIG. 6 of the measuring device in the x-direction from the front axle of the vehicle and $\omega_z$ the yaw rate of the chassis. The yaw rate of the chassis can be calculated e.g. from the following relation:

$$\omega_z = \frac{r_F}{s_F}(n_{FL}\cos\delta_L - n_{FR}\cos\delta_R)$$

where $s_F$ is the spacing explained with reference to FIG. 6 of the two front wheels. Optionally the yaw rate values thus calculated are compared with the yaw rate values calculated by the rotation rate measuring device. If the difference between these two variables exceeds a limit value, it is concluded that the wheel rotation speeds cannot be used, at least temporarily, for calculating the traveling velocity. One reason for this is, for example, an excessively large slip between the wheels and the underlying surface. If no other means of determining the traveling velocity are available, monitoring of the measured acceleration values is suspended. However, as an alternative to suspending monitoring, a slip correction can be performed so that the corrected traveling velocity can be used.

Monitoring can likewise be suspended if an anti-lock braking system (ABS) or another system is present which can detect the adhesion of at least one of the wheels to the underlying surface. If such a system indicates insufficient adhesion or at least the possibility that the adhesion has been temporarily interrupted, in one embodiment the information obtained from the wheel rotation speeds is not used for monitoring. The same can also apply to the following possibility for determining the traveling velocity for non-driven rear wheels. However, monitoring can be resumed if further information for determining the traveling velocity is available. For example, a value for the traveling velocity can be determined from information about wheel drive torques and braking torques.

If the rear wheels of the vehicle are not driven, the following relations are used to determine the traveling velocity:

$$v_x = \frac{1}{2}r_R(n_{RL}+n_{RR})$$

$$v_y = \omega_z l_R$$

where $r_R$ is the radius, explained with reference to FIG. 6, of the rear wheels, n the relevant wheel rotation speed (the first subscript R signifying "rear wheel", the second subscript L "left" and the second subscript R "right") and where $l_R$ is the spacing, explained with reference to FIG. 6, of the measuring device 1 in the longitudinal direction from the rear axle of the vehicle. The measuring device is disposed at the center of gravity of the vehicle. For the yaw rate of the chassis, a value is calculated according to the following relation:

$$\omega_z = \frac{r_R}{s_R}(n_{RL} - n_{RR})$$

Otherwise the procedure is exactly the same as that described above for determining the traveling velocity.

Optionally further slip corrections are preferably performed on the traveling velocity in accordance with a single track model, particularly if information about the drive torques and braking torques of the front wheels are available. Also required for slip corrections is the yaw acceleration which is determined by taking the time derivative of the yaw rate measured by the rotation rate measuring device. For taking the derivative further filtering can be performed.

In another option for determining the vehicle velocity, no information about the rotation speed of the wheels is used, but the vehicle lateral acceleration is calculated according to the following relation:

$$v_y = v_x \tan\delta - \omega_z l_F$$

where δ is an average steering angle (in particular the arithmetic mean of the steering angle of the right and left front wheel) and $\omega_z$ the yaw rate value measured by the rotation rate measuring device. The traveling velocity $v_x$ in the longitudinal direction (x-direction) obtained from another information source is used for the relation.

The actual longitudinal acceleration and the actual lateral acceleration of the vehicle is now calculated from the longitudinal velocity and the lateral velocity of the vehicle according to the following relations:

$$a_x = \dot{v}_x - \omega_z v_y$$

$$a_y = \dot{v}_y + \omega_z v_x$$

where $\dot{v}_x$ and $\dot{v}_y$ are the first time derivatives of the traveling velocity in the x-direction and y-direction respectively. For taking the time derivative, further filtering is performed. In particular the filtered measurement signals of the rotation rate measuring device are used for the chassis yaw rates present in these relations.

From the thus determined actual longitudinal acceleration and actual lateral acceleration, the instantaneous roll angle and the instantaneous pitch angle are used to calculate reference values for the effective longitudinal acceleration $a_x^{(R)}$ and for the effective lateral acceleration $a_y^{(R)}$ according to the following relations:

$$a_x^{(R)} = a_x - g\sin\theta$$

$$a_y^{(R)} = a_y + g\sin\phi\cos\theta.$$

The comparison values are then compared with the filtered signals of the longitudinal acceleration and lateral acceleration (in the x-direction and y-direction) measured by the acceleration measuring device. If the absolute value of the difference between the comparison value and the measured value exceeds a specified limit value in at least one of the two directions, appropriate action is taken. In particular the value of an error counter is incremented, the amount by which the value is increased being optionally dependent on the inclination of the vehicle (roll angle and/or pitch angle) and on the longitudinal velocity and/or other variables. If no error occurs over a time interval of specified length (i.e. if the specified limit value is not exceeded), the value of the error counter is decremented by a specified amount. At the same time the error counter value cannot be less than zero. For example, an error is deemed to be present if the error counter value attains or exceeds a specified limit value. In particular the limit value can be dependent on certain driving situations and/or variables characterizing said driving situations.

To monitor the acceleration measured in the z-direction by the acceleration measuring device, the following procedure is proposed: a comparison of the measured value or a variable derived therefrom with a comparison variable is performed using at least one relative position in the z-direction of the vehicle coordinate system between a chassis and a vehicle body. The relative position is preferably measured specifically using at least one ride height sensor.

In a specific embodiment, the ride height (see above) of all four wheels of the vehicle is used for this purpose.

First the variable $z_M$ is calculated according to the following equation:

$$z_M = \frac{1}{2}[p(h_{FL} + h_{FR}) + (1-p)(h_{RL} + h_{RR})]$$

where the (first) variable $z_M$ represents a weighted average of the ride heights h (the double subscripts are to be understood in the same way as for the wheel rotation rates) and where p is a parameter specifically selected for the particular vehicle or vehicle type. The variable is now differentiated twice with respect to time and optionally filtered at the same time. In addition, a second variable $a_M$ is calculated according to the following equation:

$$a_M = -\Omega^2 z_M - \Gamma \dot{z}_M$$

where $\Omega^2$ and $\Gamma$ are parameters specifically selected for the vehicle or vehicle type. The second derivative of the first variable $z_M$ and the second variable $a_M$ are compared with the following comparison variable which is calculated from the acceleration in the z-direction (vehicle coordinate system) measured by the measuring device:

$$a_z^{(R)} = a_z + g \cos\phi \cos\theta$$

where $a_z^{(R)}$ is an actual acceleration, whereas the measured acceleration $a_z$ is an effective acceleration.

It is additionally possible to use the accelerations measured in the x-direction and y-direction to monitor the acceleration measured by the acceleration measuring device in the z-direction. Disregarding the z-component of the vehicle speed vector, the following relation holds:

$$(a_z - v_y\omega_x + v_x\omega_y)^2 = g^2 - (a_x - \dot{v}_x + v_y\omega_z)^2 - (a_y - \dot{v}_y - v_x\omega_z)^2$$

where $a_x$, $a_y$, $a_z$ the measured effective accelerations and $\omega_x$, $\omega_y$, $\omega_z$ the roll, pitch and yaw rate. The vehicle longitudinal velocity fed into the above relation is determined in the manner described above. The vehicle lateral velocity $v_y$ can be determined e.g. as described earlier. In particular, information about the rotation speed of the non-driven wheels can be used. Alternatively or additionally, the vehicle lateral velocity can be determined in the manner likewise already described, an average steering angle and the yaw rate value measured by the rotation rate measuring device being used, for example, in addition to the vehicle longitudinal velocity.

In particular a time interval and a limit value are defined for the comparison. If the absolute value of the calculated effective acceleration $a_z$ is greater than the limit value and if neither the absolute value of the second time derivative of the variable $z_M$ nor the absolute value of the second variable $a_M$ is greater than the limit value, an error is deemed to be present (e.g. a value of an error counter incremented by one).

According to another aspect, the traveling velocity of the vehicle can be determined from the measured values of the measuring device. This approach is particularly advantageous if all the wheels of the vehicle are driven and/or if the traveling velocity cannot be reliably determined from the rotation speeds of non-driven wheels in particular driving situations (e.g. when the vehicle is in a skid). Such a situation can be detected, for example, from the fact that large differences occur between in particular the filtered sensor signals for the longitudinal acceleration and the lateral acceleration on the one hand and the above described reference values on the other.

The traveling velocity component $v_x$ in the x-direction and the traveling velocity component $v_y$ in the y-direction can be determined by integration of the following system of equations:

$$\dot{v}_x = a_x + \omega_z v_y$$

$$\dot{v}_y = a_y - \omega_z v_x$$

where the accelerations $a_x$ and $a_y$ in the x-direction and y-direction respectively and the yaw rate $\omega_z$ are specifically the variables measured by the measuring device. The absolute value of the traveling velocity can then be calculated from the traveling velocity components. Also the sign of the traveling velocity can be determined, as the sign information is known from the measured variables. In particular this approach can be used temporarily for determining the traveling velocity. In this case, integration preferably begins at a time when the driving situation still allows the traveling velocity to be determined by other means, e.g. on the basis of the wheel rotation rates. These traveling velocity values can then be used as initial values for the integration.

Alternatively, the vehicle velocity and the vehicle orientation can be determined simultaneously by an adaptive Kalman filter into which the x-component and the y-component of the vector of the vehicle speed as well as the roll and pitch angle are fed. In addition, the three acceleration components, in particular the four wheel rotation speeds and the steering angle (e.g. the steering wheel angle) are fed into the Kalman filter as measured variables. In particular, continuous assessment of the wheel rotation speeds takes place, which is used in turn to influence feedback coefficients of the filter.

What is claimed is:

1. An arrangement for monitoring a measuring device disposed in a wheeled vehicle, comprising
    the measuring device, said measuring device being operable to measure three linear accelerations of the wheeled vehicle which are oriented perpendicular to one another and three rotation rates of a rotational movement or of a component of a rotational movement about respective three axes of the wheeled vehicle, the three axes running perpendicular to one another,
    an orientation determining device for determining an orientation of the wheeled vehicle from the three rotation rates in a coordinate system external to the vehicle, and
    a monitoring device for monitoring at least one of the measured linear accelerations using an output variable of the orientation determining device and using a comparison variable.

2. An arrangement according to claim 1, comprising a traveling velocity determining device for determining a traveling velocity of the wheeled vehicle and which is connected to the monitoring device, said monitoring device being designed to determine a comparison variable using the traveling velocity.

3. An arrangement according to claim 2, wherein the traveling velocity determining device is designed to determine the traveling velocity using a variable characterizing a rotation speed of a wheel of the wheeled vehicle.

4. An arrangement according to claim 2, wherein the traveling velocity determining device is connected to a steering angle determining device for determining a steeling angle of at least one steerable wheel of the wheeled vehicle and wherein the traveling velocity determining device is designed to determine the traveling velocity using the steering angle.

5. An arrangement according to claim 2, wherein the traveling velocity determining device is connected to the measuring device and is designed to determine the traveling velocity using at least one of the three rotation rates.

6. An arrangement according to claim 1, wherein the measuring device has acceleration sensors for measuring the three linear accelerations and rotation rate sensors for measuring the three rotation rates and wherein the acceleration sensors and the rotation rate sensors are parts of a prefabricated constructional unit designed for mounting in the wheeled vehicle.

7. An arrangement according to claim 1, wherein the measuring device is designed such that the three linear accelerations can be measured as three measured variables linearly independent of one another.

8. An arrangement according to claim 1, wherein the measuring device is designed such that the three axes run pairwise perpendicular to one another.

9. An arrangement according to claim 1, wherein the monitoring device is designed to perform monitoring using the orientation and using a comparison acceleration, and is designed to determine the comparison acceleration without using the to-be-monitored linear acceleration measured by the measuring device.

10. An arrangement according to claim 1, wherein the monitoring device is designed to determine the comparison variable using a position of a vehicle body on which the measuring device is mounted or is to be mounted, relative to a chassis.

11. An arrangement according to claim 1, wherein the orientation determining device is designed to detect a stationary state of the wheeled vehicle and, in said stationary state, to determine the values for a specifically future determination of the orientation using at least one of the linear accelerations measured by the measuring device.

12. An arrangement according to claim 1, wherein the orientation determining device is designed to detect straight-ahead travel of the wheeled vehicle on a level surface and, in this driving situation, to determine values for a specifically future determination of the orientation using at least one of the linear accelerations measured by the measuring device.

13. A method for monitoring a measuring device disposed in a wheeled vehicle wherein the measuring device is designed to measure three linear accelerations of the wheeled vehicle which are oriented perpendicular to one another and three rotation rates of a rotational movement or of a component of a rotational movement about respective three axes of the wheeled vehicle, the three axes running perpendicular to one another, the method comprising the steps of:
  determining at least components of an orientation of the wheeled vehicle in a coordinate system external to the vehicle from the three rotation rates and
  monitoring of at least one of the measured linear accelerations using at least the components of the orientation and using a comparison variable.

14. A method according to claim 13, wherein a traveling velocity of the wheeled vehicle is determined and wherein the comparison variable is determined allowing for the traveling velocity.

15. A method according to claim 14, wherein the traveling velocity is determined using a variable characterizing a rotation speed of a wheel of the wheeled vehicle.

16. A method according to claim 14, wherein the traveling velocity is determined using a steering angle of at least one steerable wheel of the wheeled vehicle.

17. A method according to claim 14, wherein the traveling velocity is determined using at least one of the three rotation rates measured by the measuring device.

18. A method according to claim 13, wherein the three linear accelerations are measured as three measured variables linearly independent of one another.

19. A method according to claim 13, wherein the three rotation rates are each measured as rotation rates about one of three axes running pairwise perpendicular to one another.

20. A method according to claim 13, wherein at least one of the components of the orientation and a comparison acceleration are used for monitoring and wherein the comparison acceleration is determined without using the linear acceleration to be monitored.

21. A method according to claim 13, wherein the comparison variable is determined using a position of a vehicle body on which the measuring device is mounted or is to be mounted, relative to a chassis.

22. A method according to claim 13, wherein to determine the orientation, a stationary state of the wheeled vehicle is detected and, during said stationary state, values for a specifically future determination of the orientation are determined using at least one of the measured linear accelerations.

23. A method according to claim 13, wherein to determine the orientation, straight-ahead travel of the wheeled vehicle on a level surface is detected and, in this driving situation, values for a specifically future determination of the orientation are determined using at least one of the measured linear accelerations.

* * * * *